US008195029B2

(12) United States Patent
Fujiwara et al.

(10) Patent No.: US 8,195,029 B2
(45) Date of Patent: Jun. 5, 2012

(54) CONTENT VIEWING SUPPORT APPARATUS AND CONTENT VIEWING SUPPORT METHOD, AND COMPUTER PROGRAM

(75) Inventors: Nobuyuki Fujiwara, Kanagawa (JP); Tatsuya Narahara, Kanagawa (JP); Noriyuki Yamamoto, Kanagawa (JP); Mari Saito, Kanagawa (JP); Mitsuhiro Miyazaki, Kanagawa (JP); Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 1482 days.

(21) Appl. No.: 10/988,659

(22) Filed: Nov. 16, 2004

(65) Prior Publication Data

US 2005/0125828 A1 Jun. 9, 2005

(30) Foreign Application Priority Data

Nov. 26, 2003 (JP) .................................. 2003-396224

(51) Int. Cl.
*H04N 9/80* (2006.01)
(52) U.S. Cl. ......... 386/248; 386/246; 386/296; 386/297
(58) Field of Classification Search .............. 386/95–96, 386/125–125, 248
See application file for complete search history.

(56) References Cited

U.S. PATENT DOCUMENTS

| 6,341,195 | B1 * | 1/2002 | Mankovitz et al. ............ 386/291 |
| 6,397,386 | B1 * | 5/2002 | O'Connor et al. ............... 725/39 |
| 6,538,672 | B1 | 3/2003 | Dobbelaar |
| 6,904,610 | B1 * | 6/2005 | Bayrakeri et al. ............... 725/54 |
| 2002/0197053 | A1 * | 12/2002 | Nakamura et al. ............... 386/35 |
| 2003/0005429 | A1 * | 1/2003 | Colsey ................................ 725/8 |
| 2003/0044165 | A1 * | 3/2003 | Wood et al. ...................... 386/83 |
| 2003/0202773 | A1 * | 10/2003 | Dow et al. ......................... 386/46 |
| 2003/0219226 | A1 * | 11/2003 | Newell et al. .................... 386/69 |
| 2006/0107301 | A1 * | 5/2006 | Leibbrandt et al. ........... 725/134 |

FOREIGN PATENT DOCUMENTS

| JP | 8-102905 | 4/1996 |
| JP | 2000-287147 | 10/2000 |
| JP | 2001-285777 | 10/2001 |
| JP | 2002-77788 | 3/2002 |
| JP | 2002-185912 | 6/2002 |
| JP | 2002-262191 | 9/2002 |
| JP | 2003-32205 | 1/2003 |
| JP | 2003-92712 | 3/2003 |
| JP | 2003-219379 | 7/2003 |
| WO | WO 01/15438 A1 | 3/2001 |

\* cited by examiner

*Primary Examiner* — Jamie Atala

(74) *Attorney, Agent, or Firm* — Oblon, Spivak, McClelland, Maier & Neustadt, L.L.P.

(57) ABSTRACT

A content viewing support apparatus for supporting a user in operation for selecting a program desired to be recorded by one of programmed recording and recording includes: a preview scene recorded data generating section for obtaining a preview scene of each broadcast program content, and generating next broadcast preview scene recorded data; and a preview scene presenting section for, when the user performs one of an operation for programmed recording of a program and an operation for recording of the program, presenting a recorded preview scene of the program.

15 Claims, 12 Drawing Sheets

FIG. 1

BROADCAST TIMETABLE

YTH DAY OF
XTH MONTH

| Time | CANNEL A | CANNEL B | CANNEL C |
|---|---|---|---|
| 18:00 | PROGRAM A-1 | PROGRAM B-1 | PROGRAM C-1 |
| | | PROGRAM B-2 | |
| 19:00 | PROGRAM A-2 | PROGRAM B-3 | PROGRAM C-2 |
| | PROGRAM A-3 | | |
| 20:00 | PROGRAM A-4 | PROGRAM B-4 | |
| 21:00 | PROGRAM A-5 | | PROGRAM C-3 |
| 22:00 | | PROGRAM B-5 | |
| | PROGRAM A-6 | | PROGRAM C-4 |
| 23:00 | | | |

FIG. 3

EPG AFTER YTH DAY OF XTH MONTH

EPG OF PROGRAM B-3 SCHEDULED
TO BE BROADCAST NEXT TIME
(($Y+\alpha$)TH DAY OF XTH MONTH)

NEXT BROADCAST PREVIEW
SCENE BROADCAST ON
YTH DAY OF XTH MONTH

F I G. 6

| PROGRAM ID | CHANNEL | TITLE | BROADCAST DATE | BROADCAST START TIME | BROADCAST END TIME | CONTENT DESCRIPTION | GENRE | KEYWORD |
|---|---|---|---|---|---|---|---|---|
| 0001 | 8 | LOVE... | 10/8 | 21:00 | 21:54 | THIRD INSTALLMENT... | DRAMA | LOVE COMEDY |
| 0002 | 12 | NIGHT... | 10/9 | 20:00 | 20:54 | GUEST... | VARIETY SHOW | TALK |

F I G. 7

| SEGMENT ID | PROGRAM ID | SEGMENT TITLE | CLASSIFICATION | SEGMENT START TIME | SEGMENT LENGTH | RELATED INFORMATION |
|---|---|---|---|---|---|---|
| 0001 | 0001 | PREVIEW OF NEXT INSTALLMENT | N | 21:52 | 15 | 1001 |
| 0002 | 0002 | HIGHLIGHT | H | 20:32 | 360 | |

F I G. 9

| PROGRAMMED RECORDING ID | PROGRAM ID | TITLE | BROADCAST DATE | PROGRAMMED RECORDING START TIME | PROGRAMMED RECORDING END TIME | RECORDING MODE | SEGMENT ID | SEGMENT LENGTH |
|---|---|---|---|---|---|---|---|---|
| 1001 | 0001 | LOVE... | 10/8 | 21:52 | 21:53 | SP | 00001 | 15 |
| 1002 | 0018 | EUROPEAN AND AMERICAN... | 10/9 | 20:00 | 20:54 | | | 360 |

F I G. 10

| PREVIEW SCENE ID | PROGRAM ID | TITLE | BROADCAST DATE | RECORDING START TIME | RECORDING END TIME | RECORDING MODE | SEGMENT ID | SEGMENT LENGTH |
|---|---|---|---|---|---|---|---|---|
| 10001 | 0001 | LOVE... | 10/8 | 21:52 | 21:53 | SP | 00001 | 15 |
| 10002 | 0018 | EUROPEAN AND AMERICAN... | 10/9 | 20:00 | 20:54 | | | 360 |

F I G. 1 1

| PROGRAM ID | CHANNEL | TITLE | BROADCAST DATE | BROADCAST START TIME | BROADCAST END TIME | CONTENT DESCRIPTION | GENRE | KEYWORD |
|---|---|---|---|---|---|---|---|---|
| 1001 | 8 | LOVE... | 10/15 | 21:00 | 21:54 | FOURTH INSTALLMENT... | DRAMA | LOVE COMEDY |
| 1002 | 12 | NIGHT... | 10/16 | 20:00 | 20:54 | GUEST... | VARIETY SHOW | TALK |

F I G. 1 2

| SEGMENT ID | PROGRAM ID | SEGMENT TITLE | CLASSIFICATION | SEGMENT START TIME | SEGMENT LENGTH | RELATED INFORMATION |
|---|---|---|---|---|---|---|
| 01001 | 1001 | PREVIEW OF NEXT INSTALLMENT | N | 21:52 | 15 | 2001 |
| 01002 | 1002 | HIGHLIGHT | H | 20:32 | 360 | |

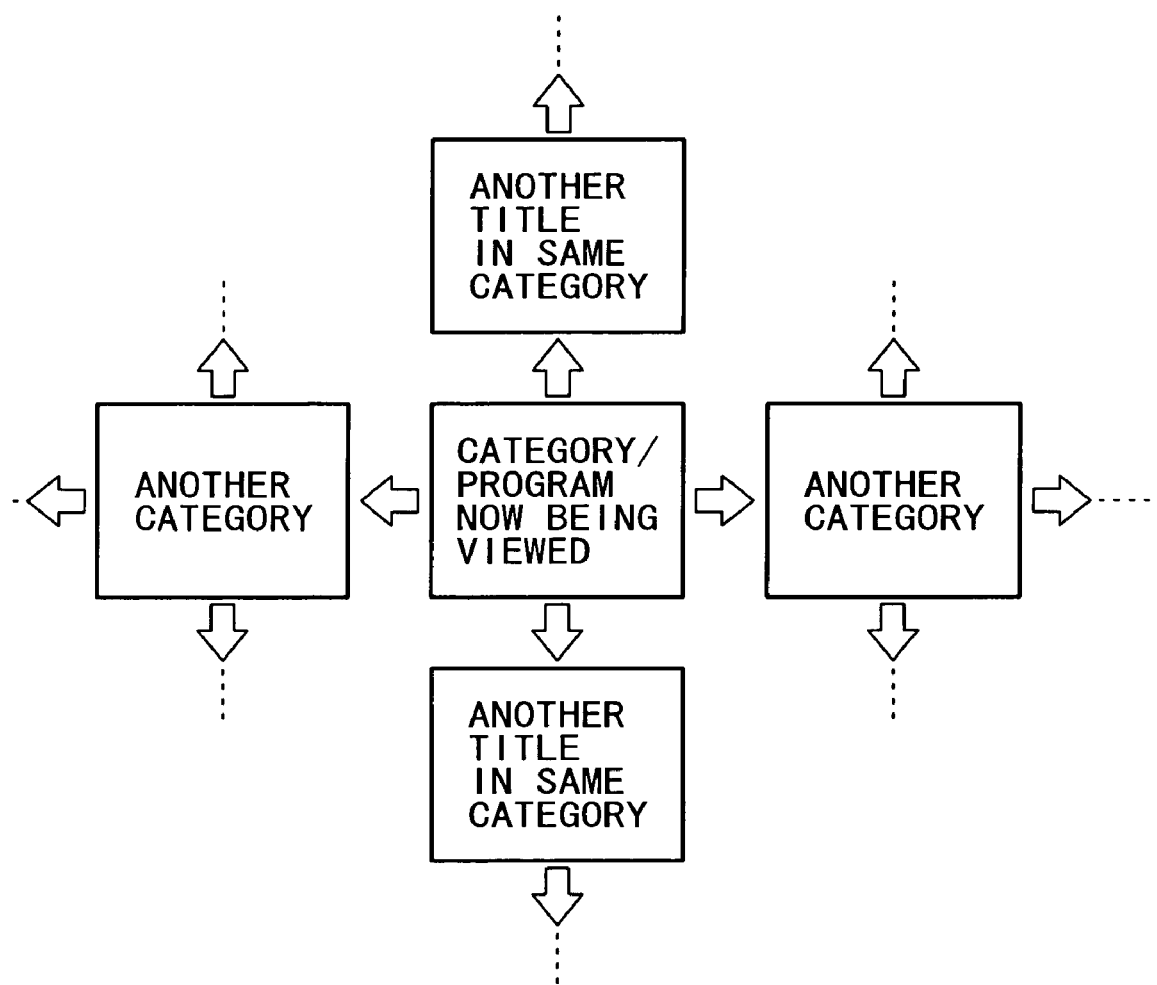
F I G. 1 4

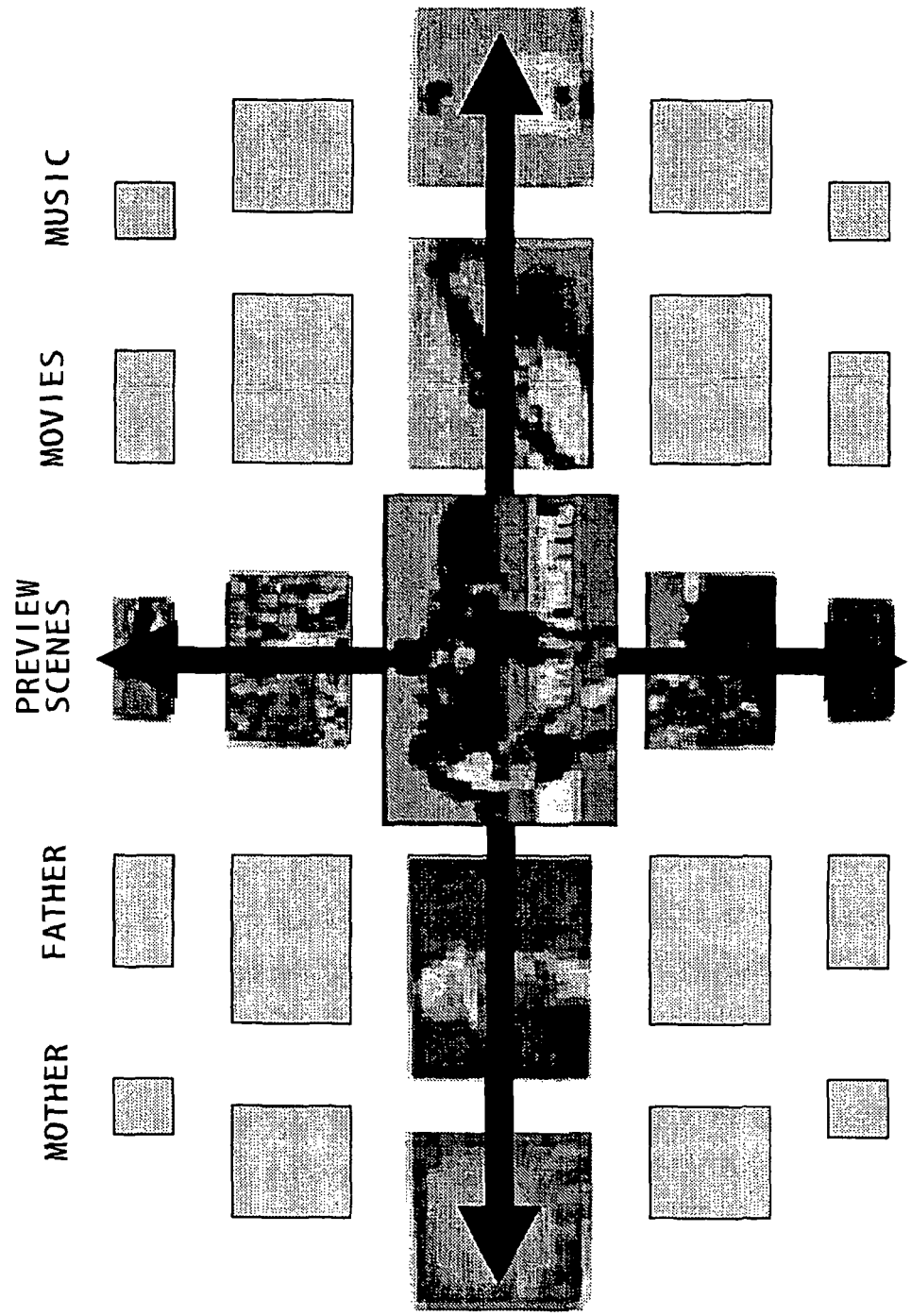

CONTENT VIEWING SUPPORT APPARATUS AND CONTENT VIEWING SUPPORT METHOD, AND COMPUTER PROGRAM

BACKGROUND OF THE INVENTION

The present invention relates to a content viewing support apparatus and a content viewing support method, and a computer program that assist in viewing of broadcast contents, and particularly to a content viewing support apparatus and a content viewing support method, and a computer program that assist in viewing of contents stored on a receiving client side.

More specifically, the present invention relates to a content viewing support apparatus and a content viewing support method, and a computer program that support a user in operation for programmed recording or recording of broadcast contents, and particularly to a content viewing support apparatus and a content viewing support method, and a computer program that facilitate determination of a program desired to be recorded by programmed recording or recording by the user through display of information on programs scheduled to be broadcast, such as EPG (Electronic Program Guide) or the like.

Broadcasting plays an immense role in modern information-oriented civilized society. Television broadcasting, in particular, which directly delivers sound and video information to viewers, has a great influence. Broadcasting technology includes a wide variety of technologies, such as signal processing, transmission and reception of signals, audio and video information processing, and the like. Further, there are various transmission forms (modalities) for providing program contents to users, such as broadcasting systems using radio waves such as terrestrial waves, satellite waves and the like, cable television systems, and net programs provided by using computer communication.

A dissemination rate of television is very high, with television sets installed in almost all households. Broadcast contents distributed from each broadcasting station are viewed by an indefinite number of the general public. In another mode of viewing broadcast contents, there is a server type broadcasting system in which received contents are recorded on a viewer side and then reproduced at a desired time.

Recent development of digital technology has made it possible to store a large amount of AV data comprising video and audio. For example, with HDDs (Hard Disk Drives) having a capacity of a few ten GB or more available at relatively low prices, HDD-based recorders, personal computers (PCs) having functions for recording and viewing television programs, and the like are appearing.

The HDD is a device capable of random access to recorded data. Hence, in reproducing recorded contents, unlike a case of conventional video tape, it is not necessary to simply reproduce a recorded program sequentially from a start; it is possible to directly start reproducing a desired program (or a specific scene or a specific segment in the program).

With increase in the capacity of the HDD, however, when a large number of programs are stored, a user is puzzled as to which program to view first, that is, puzzled over selection of program contents. Some assistance for viewing is considered necessary in order to prevent contents stored with effort from being left unused and utilize the contents effectively.

A so-called electronic program guide (EPG) system, for example, is known in which a program guide for selecting a television broadcast program is superimposed on an image signal, the image signal is transmitted, and then the program guide is displayed on a display device on a receiving side. An EPG is obtained in parallel with a process of recording a broadcast program, and the EPG is presented when a user reproduces and views the recorded program, whereby a certain degree of effect of viewing assistance can be obtained.

EPG systems include a VBI (Vertical Blanking Interval) system (see Japanese Unexamined Patent Publication No. Hei 6-504165 (U.S. Pat. No. 5,353,121), for example) and a digital satellite system as used in a digital direct satellite broadcast (DSS: Digital Satellite System (a trademark of Hughes Communication)) (see Japanese Patent Laid-Open No. Hei 8-111823 (U.S. Pat. No. 5,754,258, U.S. Pat. No. 6,519,009), for example).

In the VBI system, VBI data comprising EPG is inserted at a position that does not affect an image proper on a horizontal scanning line in normal (VHF (Very High Frequency) band) terrestrial wave television broadcast, and transmitted. A receiving side can generate display data of an electronic program guide from the VBI data, and display the display data on a monitor.

In the digital satellite system, EPG data is digitized together with image data proper, then packetized, and transmitted. A receiving side stores the EPG data in a memory, generates corresponding display data, and displays the display data on a monitor.

In both systems, a user can select a program that the user desires to view while viewing the electronic program guide displayed on the monitor.

However, program information of the conventional EPG is a title, a genre, a broadcasting station, a broadcast start time, a broadcast end time, and program introducing contents. Thus the conventional EPG introduces a program mainly by text. Therefore, in order to determine which program to view, the user needs to silently read EPG text such as program introducing contents and the like on a screen, which is troublesome.

SUMMARY OF THE INVENTION

It is an object of the present invention to provide a content viewing support apparatus and a content viewing support method, and a computer program that are excellent in suitably assisting in viewing of contents stored on a receiving client side.

It is another object of the present invention to provide a content viewing support apparatus and a content viewing support method, and a computer program that are excellent in suitably supporting a user in operation for programmed recording or recording of broadcast contents.

It is a further object of the present invention to provide a content viewing support apparatus and a content viewing support method, and a computer program that are excellent in facilitating determination of a program desired to be recorded by programmed recording or recording by the user through display of information on programs scheduled to be broadcast, such as EPG or the like.

The present invention has been made in view of the above problems. According to a first aspect of the present invention, there is provided a content viewing support apparatus for supporting a user in operation for selecting a program desired to be recorded by one of programmed recording and recording, the content viewing support apparatus including: a preview scene recorded data generating section for obtaining a preview scene of each broadcast program content, and generating next broadcast preview scene recorded data; and a preview scene presenting section for, when the user performs one of an operation for programmed recording of a program and an operation for recording of the program, presenting a recorded preview scene of the program.

The preview scene recorded data generating section includes: a preview scene identifying section for identifying the preview scene of each broadcast program content; a preview scene recording managing section for performing programmed recording of the identified preview scene; and a preview scene recording section for recording each preview scene to be recorded by programmed recording.

When the user views an EPG of a next installment scheduled to be broadcast of one of a program being broadcast and a program being reproduced, the preview scene presenting section reproduces a preview scene of the program in the next broadcast preview scene recorded data.

Assistance in programmed recording or recording operation using EPG is generally adopted. However, program information of the conventional EPG is a title, a genre, a broadcasting station, a broadcast start time, a broadcast end time, and program introducing contents. Thus the conventional EPG introduces a program mainly by text. Therefore, in order to determine which program to view, the user needs to read to oneself of EPG text such as program introducing contents and the like on a screen, which is troublesome.

Accordingly, in the present invention, a preview scene of each broadcast content is recorded within a client apparatus in advance, and the recorded preview scene is reproduced when a user performs a programmed recording operation or a recording operation, whereby the user can determine more intuitively whether the program is a program desired to be viewed.

Normal broadcast contents are arranged in a time series by different channels A, B, C . . . on a time table as shown in FIG. 1. In general, programs often broadcast a next broadcast preview scene shortly before an end of the broadcast to have viewers continue to view a next broadcast.

The content viewing support apparatus according to the present invention is implemented as a video recording and reproducing apparatus that is programmed to record or records a received broadcast content, or another similar CE apparatus, for example. The content viewing support apparatus records next broadcast preview scenes of broadcast contents one after another.

Metadata describing content structure information and other additional information is often attached to a data stream comprising broadcast contents. By referring to such metadata, it is possible to identify a position of a next broadcast preview scene in the data stream. The content viewing support apparatus according to the present invention performs programmed recording or recording of next broadcast preview scenes identified from metadata one after another.

In order to record a next broadcast preview scene, metadata enabling identification of the part of the next broadcast preview scene is essential. Alternatively, when a next broadcast preview scene in a broadcast content cannot be identified from metadata or other sections, a predetermined range in the data stream is estimated to be a preview scene, and recorded by programmed recording or recorded. For example, a next broadcast preview scene can be recorded by programmed recording or recording for a few minutes (for example five minutes) before an end of the program.

Then, the content viewing support apparatus according to the present invention edits thus collected next broadcast preview scenes as next broadcast preview scene recorded data as shown in FIG. 2, and temporarily stores the next broadcast preview scene recorded data in a predetermined storage area within the apparatus.

While in the example of FIG. 2, the next broadcast preview scene recorded data is created from preview scenes broadcast shortly before the end of previous programs, the present invention is not limited to this. For example, next broadcast preview scene recorded data can be generated from a next broadcast preview scene for program advertisement broadcast during a time between programs and from a next broadcast preview scene broadcast on a program introducing program. Further, streaming data for a preview released on the Internet, for example, and other media can be used as a preview of a program for broadcasting a movie when the apparatus has the capability.

Suppose that a user views an EPG of a program to view the program or program recording of the program. At this time, when a next broadcast preview scene broadcast last time is stored as recorded data in a storage area within the apparatus, the apparatus can reproduce the next broadcast preview scene. By reproducing and checking the preview scene of the program to be viewed or to be recorded by programmed recording, the user can determine more intuitively whether the program scheduled to be broadcast is really a program to be viewed or to be recorded by programmed recording.

FIG. 3 shows a preview scene in the next broadcast preview scene recorded data being reproduced when an EPG of a program B-3 to be broadcast next time (on a (Y+α)th day of an Xth month) is viewed.

Further, according to a second aspect of the present invention, there is provided a computer program described in a computer readable form, for performing a process for supporting a user in operation for selecting a program desired to be recorded by one of programmed recording and recording on a computer system, the computer program including: a preview scene recorded data generating step for obtaining a preview scene of each broadcast program content, and generating next broadcast preview scene recorded data; and a preview scene presenting step for, when the user performs one of an operation for programmed recording of a program and an operation for recording of the program, presenting a recorded preview scene of the program.

The computer program according to the second aspect of the present invention is a definition of a computer program described in a computer readable form, for implementing a predetermined process on a computer system. In other words, by installing the computer program according to the second aspect of the present invention onto a computer system, a cooperative action is exerted on the computer system, and thus similar effects to those of the content viewing support apparatus according to the first aspect of the present invention can be obtained.

According to the present invention, it is possible to provide a content viewing support apparatus and a content viewing support method, and a computer program that are excellent in suitably assisting in viewing of contents stored on a receiving client side.

Also, according to the present invention, it is possible to provide a content viewing support apparatus and a content viewing support method, and a computer program that are excellent in suitably supporting a user in operation for programmed recording or recording of broadcast contents.

In addition, according to the present invention, it is possible to provide a content viewing support apparatus and a content viewing support method, and a computer program that are excellent in facilitating determination of a program desired to be recorded by programmed recording or recording by the user through display of information on programs scheduled to be broadcast, such as EPG or the like.

Other and further objects, features, and advantages of the present invention will become apparent from more detailed description in the following of embodiments of the present invention with reference to the accompanying drawings.

BRIEF DESCRIPTION OF THE DRAWINGS

FIG. 1 is a diagram showing programs arranged by broadcast channel on a time table;

FIG. 3 is a diagram showing a preview scene in the next broadcast preview scene recorded data being reproduced when an EPG of a program B-3 to be broadcast next time (on a (Y+α)th day of an Xth month) is viewed;

FIG. 6 is a diagram showing an example of data structure of program basic information received as EPG data;

FIG. 7 is a diagram showing an example of data structure of segment information received as EPG data;

FIG. 9 is a diagram showing a state after a programmed recording of a preview scene of a program is added to the preview scene programmed recording list;

FIG. 10 is a diagram showing a state after the preview scene of the program is added to a preview scene list;

FIG. 11 is a diagram showing the program basic information after the preview scene is recorded;

FIG. 12 is a diagram showing the segment information after the preview scene is recorded;

FIG. 14 is a diagram schematically showing an example of screen configuration of a MyCast view; and FIG. 15 is a diagram showing a state in which a "preview scene" category is provided on a GUI screen of a channel server.

DETAILED DESCRIPTION OF THE PREFERRED EMBODIMENT

A preferred embodiment of the present invention will hereinafter be described in detail with reference to the drawings.

A content viewing support apparatus according to the present invention records a preview scene of each broadcast content in advance, and reproduces the recorded preview scene when a user performs a recording programming or recording operation, thereby making it possible to determine more intuitively whether the program is a program desired to be viewed.

The content viewing support apparatus according to the present invention includes: a device for receiving broadcasts; a device for recording and storing broadcast programs; a device for reproducing the recorded and stored programs; a device for receiving EPG data; a device for recording and storing the EPG data; a device for programming recording of a program by using the EPG; and a device for recording data. The content viewing support apparatus according to the present invention is implemented as a video recording and reproducing apparatus that is programmed to record or records a received broadcast content, or another similar CE apparatus, for example.

Figure 2:
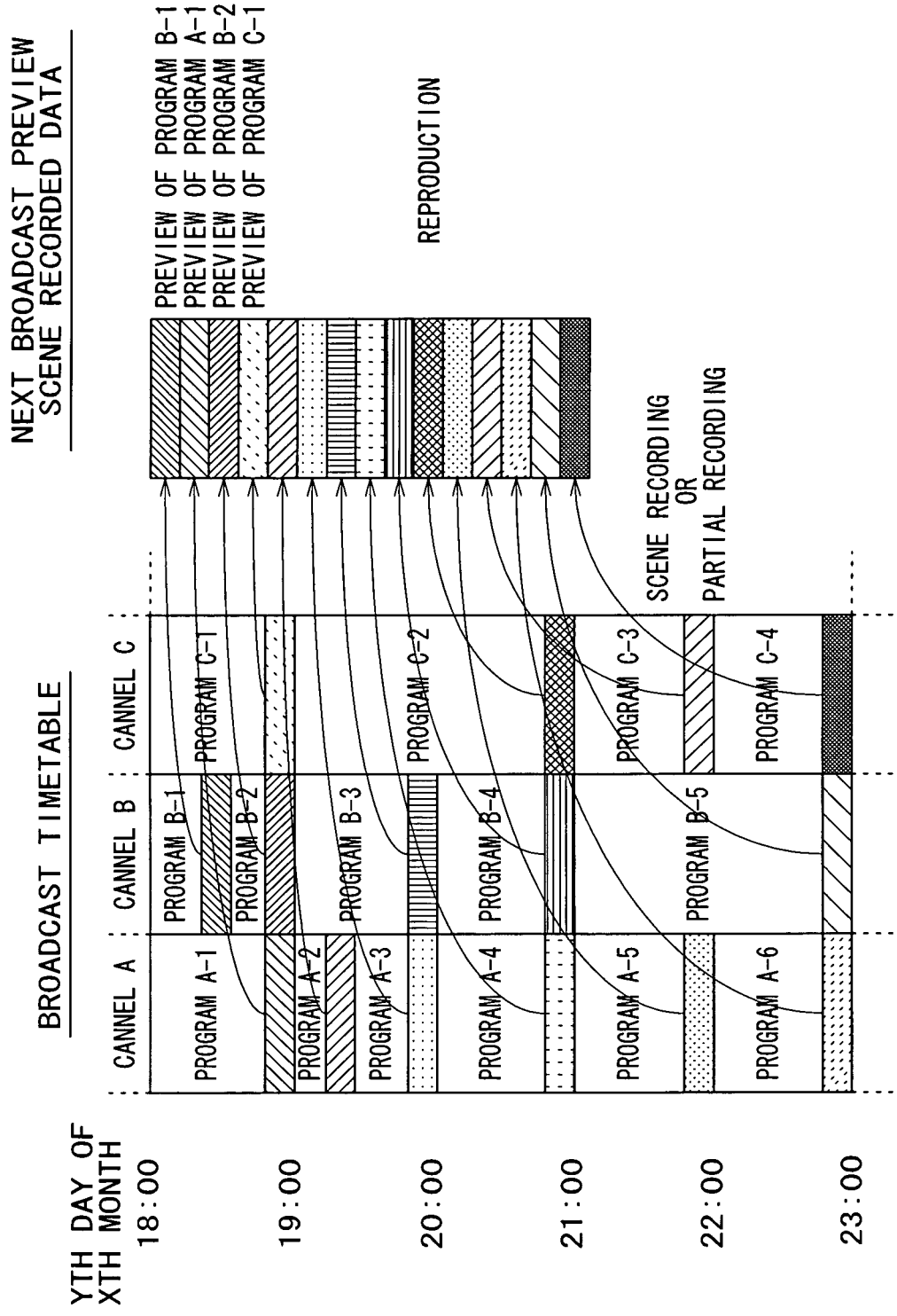
FIG. 2 is a schematic diagram showing a structure of next broadcast preview scene recorded data edited by a content viewing support apparatus according to the present invention.
Figure 4:
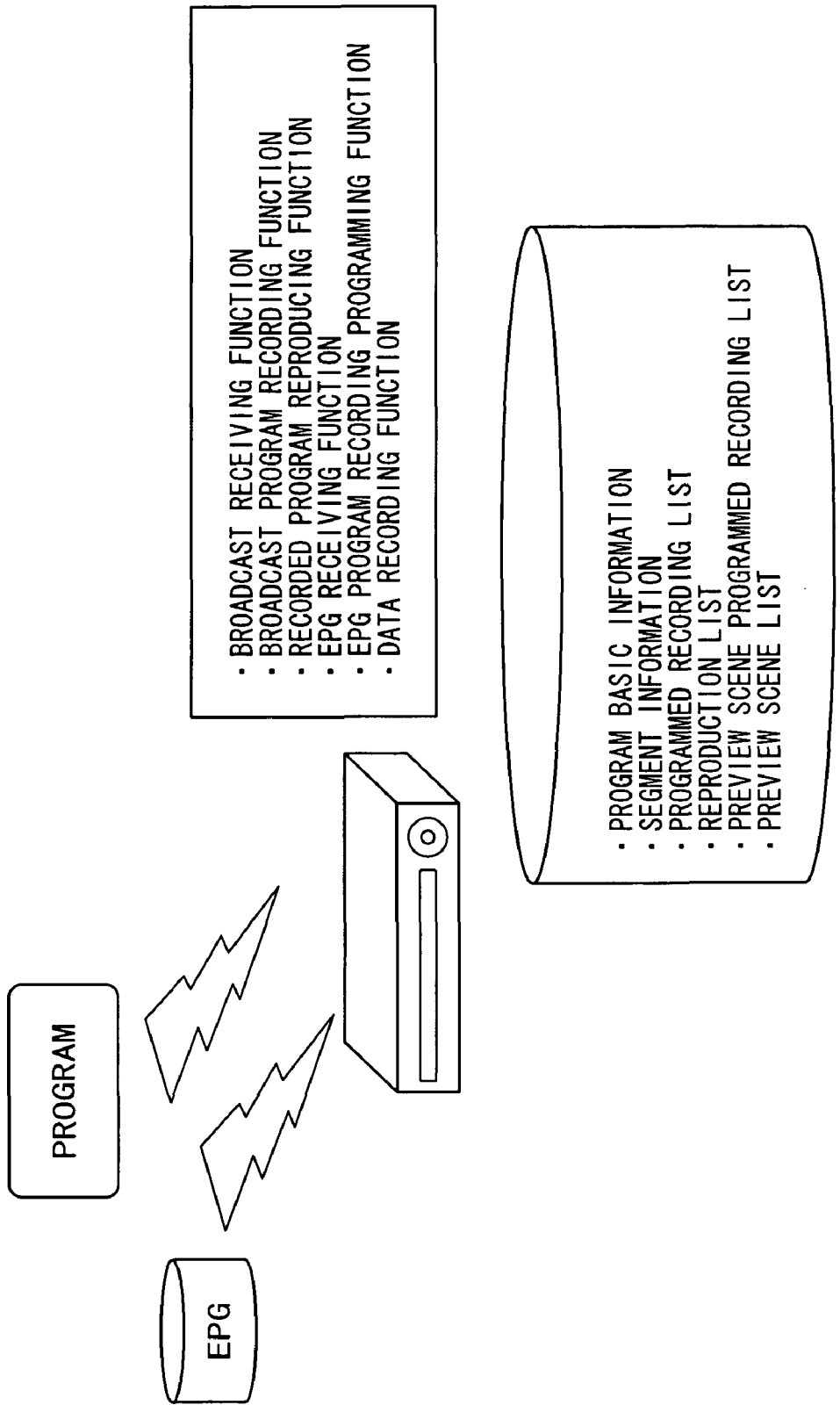
FIG. 4 is a diagram schematically showing a configuration of a system for implementing content viewing support according to the present invention.

FIG. 4 schematically shows a configuration of a system for implementing content viewing support according to the present invention.

The CE apparatus side receives EPG data distributed by broadcast wave, and stores the EPG data in the data recording device. A program that the CE apparatus is programmed to record on the basis of an EPG is recorded under specified recording conditions at a specified time. The recorded program can be reproduced later.

In addition to the recorded program data, the data recording CE apparatus side records and stores program basic information and segment information received as the EPG data, a programmed recording list, a reproduction list, a preview scene programmed recording list, a preview scene list, and the like.

Figure 5:
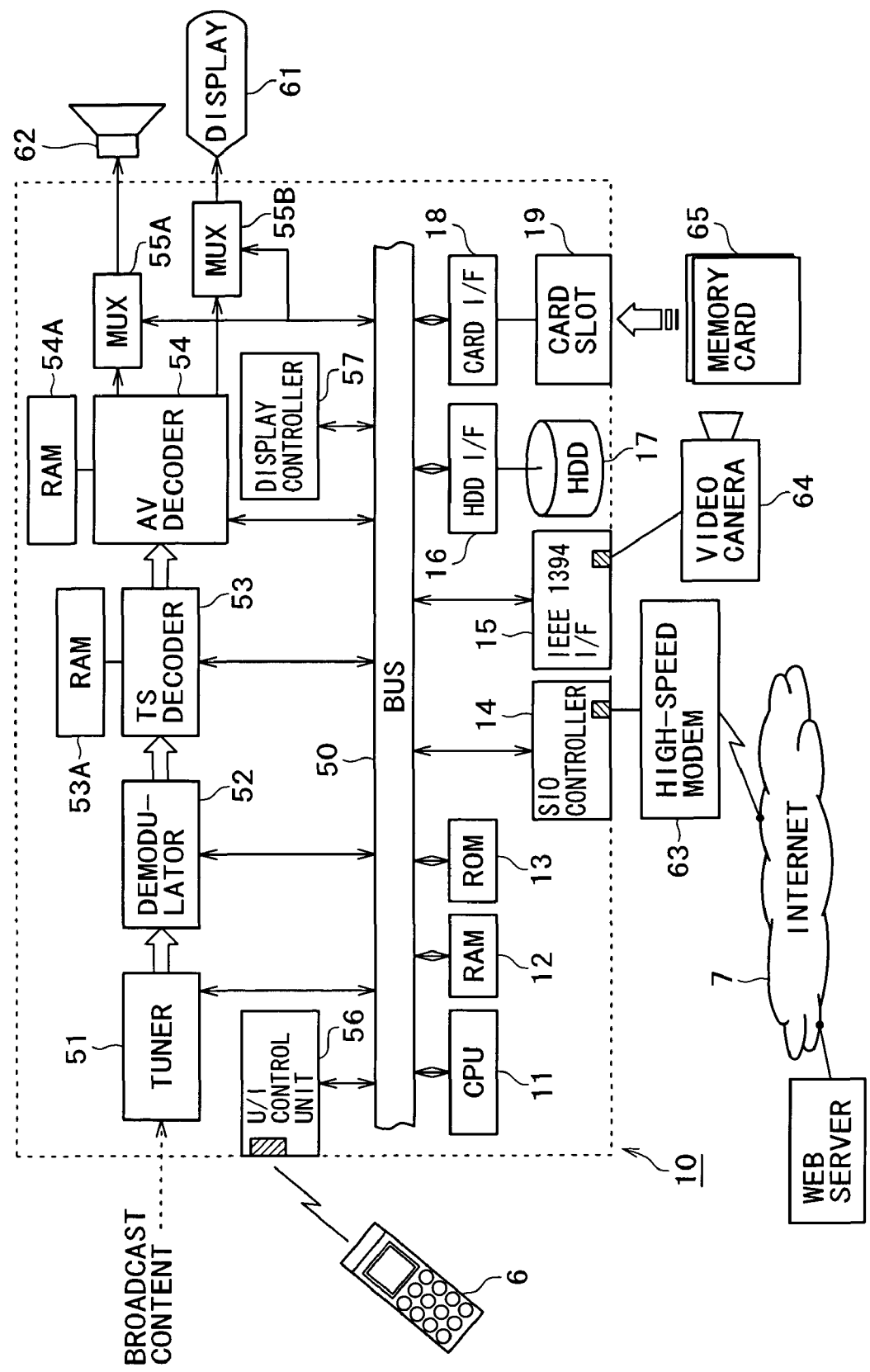
FIG. 5 is a diagram showing a hardware configuration of the content viewing support apparatus implemented as a video recording and reproducing apparatus that is programmed to record or records a received broadcast content.

The content viewing support apparatus according to the present invention is implemented as a video recording and reproducing apparatus that is programmed to record or records a received broadcast content, or another similar CE apparatus, for example. FIG. 5 shows a hardware configuration of the content viewing support apparatus implemented as a video recording and reproducing apparatus that is programmed to record or records a received broadcast content.

A CPU (Central Processing Unit) 11 as a main controller within the video recording and reproducing apparatus 10 formed integrally with a television receiver is interconnected with each hardware component via a bus 50. The CPU 11 performs centralized control of each component. Each part of the receiver 10 will be described below.

A broadcast wave received by an antenna (not shown) is supplied to a tuner 51. While the broadcast wave is compliant with a specified format, the broadcast wave may be not only a broadcast wave for satellite broadcasting but also a wire broadcast wave or a terrestrial wave; the broadcast wave is not specifically limited.

The tuner 51 tunes in to, or selects a broadcast wave of a specified channel according to an instruction from the CPU 11, and outputs received data to a succeeding demodulator 52. The demodulator 52 demodulates the received data, which is digitally modulated. Incidentally, depending on whether the transmitted broadcast wave is an analog wave or a digital wave, a configuration of the tuner 51 can be changed or expanded as required.

The demodulated digital data is a transport stream (TS) formed by multiplexing AV data compressed by an MPEG2 system, for example, and metadata comprising EPG and other program information and the like. The former AV data comprises video and audio information constituting a broadcast program proper, and subtitle data. The latter metadata is data that accompanies the broadcast program proper, and is used for programmed recording or recording of the broadcast program (to be described later).

A TS decoder 53 interprets the transport stream, and separates the transport stream into the AV data compressed by the MPEG2 system and the metadata. The TS decoder 53 sends the former to an AV decoder 54, and transmits the latter to the CPU 11 via the bus 50. The TS decoder 53 may have a memory 53A for storing work data as its local memory.

The AV decoder 54, receiving the real-time AV data compressed by the MPEG2 system from the TS decoder 53, separates the real-time AV data into compressed video data and compressed audio data. Then, the AV decoder 54 subjects the video data to decompression processing according to the MPEG2 system to reproduce an original video signal. The AV decoder 54 subjects the audio data to PCM (Pulse Code Modulation) decoding, and combines the result with an added sound to form a reproduced audio signal. The AV decoder 54 may have a memory 54A for storing work data as its local memory. The reproduced video signal is outputted to a display 61 via a multiplexer 55B for display, and the reproduced audio signal is outputted as sound to a speaker 62 via a multiplexer 55A. Alternatively, as for a broadcast content of a program the recording of which is programmed, compressed video data and compressed audio data are transferred to a hard disk device 17 via the bus 50 and then recorded on the hard disk device 17 without being decompressed. In this case, at a time of viewing, the compressed video data and compressed audio data are read from the hard disk device 17, and then subjected to decompression processing by the AV decoder 54 to be reproduced and outputted.

A user interface control unit 56 is a module for processing an input operation from a user. The user interface control unit 56 for example has operating buttons/switches (not shown) for direct manual operation by the user, and a function of receiving a remote operation from a remote control 66 via infrared radiation (IR) or the like. The user interface control unit 56 may also include a display panel for displaying present settings and an LED indicator (not shown). The user can perform operations for selection of a broadcast program, recording, recording programming, reproduction, preview scene reproduction (to be described later), erasure of a recorded program, and the like via the remote control 66 and the user interface control unit 56.

The CPU 11 is a main controller that controls operation of the receiver 10 as a whole. Also, on the basis of program information transferred via the bus 50, the CPU 11 can perform processes of recording, recording programming, aiding in recording programming and recording operations, reproduction, and the like. Thus, program basic information and segment information received as EPG data, a programmed recording list, a reproduction list, a preview scene programmed recording list, a preview scene list, and the like are recorded and stored.

A RAM (Random Access Memory) 12 is a writable volatile memory used to load executing program code for the CPU 11 and write work data of the executing program. A ROM 13 is a read only memory that permanently stores a self-diagnosis and/or initialization program executed at a time of turning on the receiver 10 and microcode for hardware operation.

A serial input/output (SIO) controller 14 is a peripheral controller for serial data exchange with an external device of the receiver 10. A serial port provided by the SIO controller 14 is externally connected with a high-speed modem 63 for modulating and demodulating transmission data on an analog telephone line. Through a PPP (Point-to-Point Protocol) connection (or a connection in another form) to a predetermined access point (not shown) via the high-speed modem 63, the receiver 10 is connected to the Internet 7 as a wide area network to form an up link to a broadcasting station.

An IEEE (Institute of Electrical and Electronics Engineers) 1394 interface 15 is a serial high-speed interface capable of data transmission and reception at a few hundred MBps. An IEEE 1394 port can be connected with external devices ready for IEEE 1394 in a form of a daisy chain connection or a tree connection. Devices ready for IEEE 1394 include a video camera 64 and a scanner (not shown), for example.

A hard disk drive (HDD) 17 is an external storage device for storing programs and data in a predetermined file format. The HDD 17 has a relatively high capacity of a few ten to a few hundred GB. The HDD 17 is connected to the bus 50 via a hard disk interface 16. The HDD 17 in the present embodiment is used for recording, programmed recording, and reproduction of received broadcast programs, storage of next broadcast preview scene recorded data (to be described later) and program-related information, and the like.

A card interface 18 is a device for implementing a bus protocol between a card type device 65 loaded into a card slot 19 and the bus 50. One example of the card type device 65 is a PC card formed as a cartridge type with a size of a credit card.

A display controller 57 is a dedicated controller for controlling display output of broadcast program information and the like on the basis of data broadcast contents.

The video recording and reproducing apparatus 10 controls channel selecting operation of the tuner 51, and controls display of program information, for example, according to a user input command via the user interface control unit 56. Specifically, the CPU 11 processes program information transferred from the TS decoder 53 to convert the program information into data for display, and then supplies the data for display to the display controller 57. The display controller 57 generates a video signal of the program information on the basis of the display data, and then supplies the video signal to the multiplexer 55B.

Also, the CPU 11 processes audio data included in the program information, and then supplies the audio data to the multiplexer 55A via the bus 50. The multiplexers 55A and 55B multiplex the display data and the audio data supplied from the CPU 11 with video data (and subtitles) and audio data, respectively, as a broadcast program proper outputted from the AV decoder 54, and then output the results to the display 61 and the speaker 62.

In addition, the CPU 11 performs operation of reproduction of received broadcast programs, operations of recording and recording programming, and operation of erasure of recorded programs.

Further, the CPU 11 in the present embodiment for example analyzes metadata accompanying a broadcast content such as EPG, identifies a next broadcast preview scene in the broadcast content on the basis of a result of the analysis of the metadata, obtains and stores the next broadcast preview scene, and generates next broadcast preview scene recorded data. When the user performs an operation for programmed recording or recording of a broadcast program, the CPU 11 reproduces a preview scene of the program. By reproducing and checking the preview scene of the program to be viewed or to be recorded by programmed recording, the user can determine more intuitively whether the program scheduled to be broadcast is really a program to be viewed or to be recorded by programmed recording.

In order to record a next broadcast preview scene, metadata enabling the part of the next broadcast preview scene to be identified is essential. Alternatively, when a next broadcast preview scene in a broadcast content cannot be identified from metadata or other sections, a predetermined range in a data stream is estimated to be a preview scene, and recorded by programmed recording or recorded. For example, a next broadcast preview scene can be recorded by programmed recording or recording for a few minutes (for example five minutes) before an end of the program. Also, next broadcast preview scene recorded data can be generated from a next broadcast preview scene for program advertisement broadcast during a time between programs and from a next broadcast preview scene broadcast on a program introducing program. Further, streaming data for a preview released on the Internet, for example, and other media can be used as a preview of a program for broadcasting a movie when the apparatus has the capability.

In order to generate next broadcast preview scene recorded data, the content viewing support apparatus according to the present embodiment records and stores program basic information and segment information received as EPG data, a programmed recording list, a reproduction list, a preview scene programmed recording list, a preview scene list, and the like in addition to recorded program data.

FIG. 6 shows an example of data structure of program basic information received as EPG data. As shown in FIG. 6, the program basic information comprises basic attribute information of each program, such as a program ID, a channel, a title, a broadcast data, a broadcast start time, a broadcast end time, content description, a genre, a keyword and the like of the program.

A rich EPG includes, in addition to program basic information, segment information describing highlight scenes of a program and contents, and a scene for creating a bookmark of a topic headline.

FIG. 7 shows an example of data structure of segment information received as EPG data. The segment information comprises a title, a classification, a segment start time, segment length, and other related information (such as a program ID of a program scheduled to be broadcast next time, for example) of each program segment.

The video recording and reproducing apparatus 10 as content viewing support apparatus generates a list of programs to be recorded automatically, that is, a recording program list, using the program basic information and the segment information. Further, the video recording and reproducing apparatus 10 generates a preview scene list to record preview scenes of the programs entered in the recording program list. The video recording and reproducing apparatus 10 also generates a list of the programs recorded according to the recording program list as a reproduction list.

Figure 8:
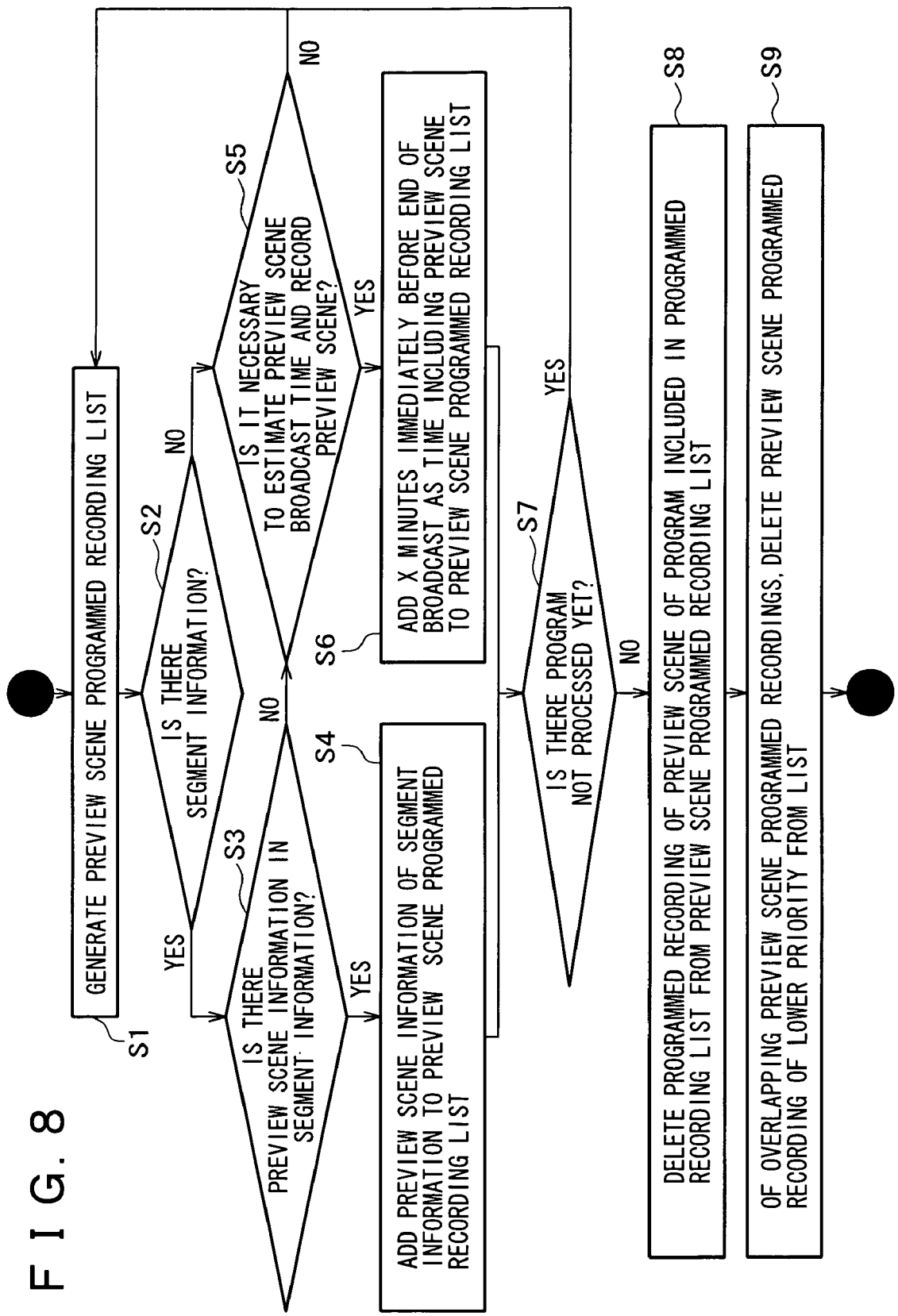
FIG. 8 is a flowchart showing a process procedure for generating a preview scene programmed recording list.

FIG. 8 shows a process procedure for generating a preview scene programmed recording list in the form of a flowchart. This process procedure is implemented in practice in the form of the CPU 11 executing predetermined program code. The process shown in FIG. 8 is performed for each program scheduled to be broadcast and included in the program basic information.

First, a preview scene programmed recording list is generated (step S1). Then, one program to be processed is extracted from the list, and whether there is segment information on the program is determined (step S2).

When there is segment information, whether preview scene information is present in the segment information is determined (step S3). When preview scene information is present in the segment information, the preview scene information is added to the preview scene programmed recording list (step S4).

On the other hand, when there is no segment information on the program being processed (step S2), and when the segment information is present but no preview scene information is present (step S3), whether a preview scene of the program needs to be recorded after estimation of a preview scene broadcast time is determined (step S5). Conditions for this determination include for example a title, a genre, and a time period (prime time or the like) often recorded and viewed in the past.

When it is determined that a preview scene of the program needs to be recorded after estimation of a preview scene broadcast time (step S5), X minutes immediately before an end of the broadcast, for example, is set as a time period including the preview scene, and the time is added to the preview scene programmed recording list (step S6).

On the other hand, when it is determined that the preview scene does not need to be recorded (step S5), the process returns to step S1 to start processing a next program without making an addition to the preview scene programmed recording list.

After the process of making additions to the preview scene programmed recording list is completed for all programs (step S7), a redundancy process in the programmed recording list and the preview scene programmed recording list is performed (step S8). For example, in the case of contents of a main part of a program already entered in the programmed recording list, it is supposed that viewing of the contents by the user is assured already and that checking a preview scene of the program is not needed. Therefore the preview scene is excluded from the preview scene programmed recording list. Also, a preview scene programmed recording of low priority is deleted from the preview scene programmed recording list (step S9).

A process flow for performing a preview scene recording process will be described by taking as an example a case where there is segment information.

Program basic data and segment data are obtained from EPG data obtained by a broadcast wave distribution. In this case, a program with a program ID of 0001 is present in the program basic information shown in FIG. 6, and a segment ID of 00001 as segment information for the program ID of 0001 is present in the segment information shown in FIG. 7. The segment information with the segment ID of 00001 includes scene information on a preview of a next installment on the program having the program ID of 0001 (15 minutes from 21:52 is a segment for the preview of the next installment) and a program ID of 1001 of the program scheduled to be broadcast next time.

Then, since presence of a preview scene for the program ID of 0001 is confirmed as a result of performing the process flow for generating the preview scene programmed recording list (see FIG. 8), a programmed recording of the preview scene for the program ID of 0001 is added to the preview scene programmed recording list.

FIG. 9 shows a state after the programmed recording of the preview scene is added. The preview scene programmed recording for the program ID of 0001 is added as a programmed recording ID of 1001 to the preview scene programmed recording list.

When the recording of the preview scene is ended, information on the recorded preview scene is added to a preview scene list, and the corresponding entry is deleted from the preview scene programmed recording list.

FIG. 10 shows the preview scene list after the preview scene is recorded. In the example of FIG. 10, the preview scene for the program ID of 0001 is added as a preview scene ID of 10001 to the preview scene list.

When the preview scene is recorded, the recorded preview scene is assigned a new program ID, and the program basic information and the segment information are updated. FIG. 11 shows the program basic information after the preview scene is recorded. FIG. 12 shows the segment information after the preview scene is recorded.

Recorded preview scenes may be put together in a list for display and reproduction. Alternatively, after EPG data including program basic information of a next installment program corresponding to the preview scene is distributed later, when the program basic information of the next installment program is displayed on an EPG screen, a button or a menu prompting for reproduction of the preview scene may be displayed to prompt for reproduction of the preview scene on the basis of association between the related information 1001 of the segment information shown in FIG. 7 and the program ID of 1001 of the program basic information after the recording of the preview scene as shown in FIG. 11.

Reference to the segment information shown in FIG. 12 about the program ID of 1001 of the program basic information shown in FIG. 11 indicates presence of segment information on a next installment preview scene with a segment ID of 01001.

It is to be fully understood that preview scene information can be thus obtained and identified as in a manner of a chain using program basic information and segment information.

Incidentally, segment information can be generated from standard EPG and ECG data or the like, such for example as segment description metadata of TV-Anytime, segmentation metadata of description language type metadata in ARIB (Association of Radio Industries and Businesses) STD-B38 "Coding, Transmission, and Storage Control System in Server Type Broadcasting" (based on TV-Anytime specifications), Audio Video Segment Description Scheme of a content structure description tool (Structure) of a content description tool (Content Description) of MPEG7, and a program group index and an intra-program index in ARIB STD-B10, Third Part, "Data Structure and Definition of Extension Information in Program Arrangement Information."

When a user views an EPG of a program for viewing or recording programming, the video recording and reproducing apparatus 10 according to the present embodiment reproduces a next broadcast preview scene broadcast in a previous installment in the case where the next broadcast preview scene is stored as recorded data in a storage area within the apparatus. By reproducing and checking the preview scene of the program to be viewed or to be recorded by programmed recording, the user can determine more intuitively whether the program scheduled to be broadcast is really a program to be viewed or to be recorded by programmed recording.

The recorded preview scene is provided to the user using a GUI (Graphical User Interface) as follows, for example.

Figure 13:
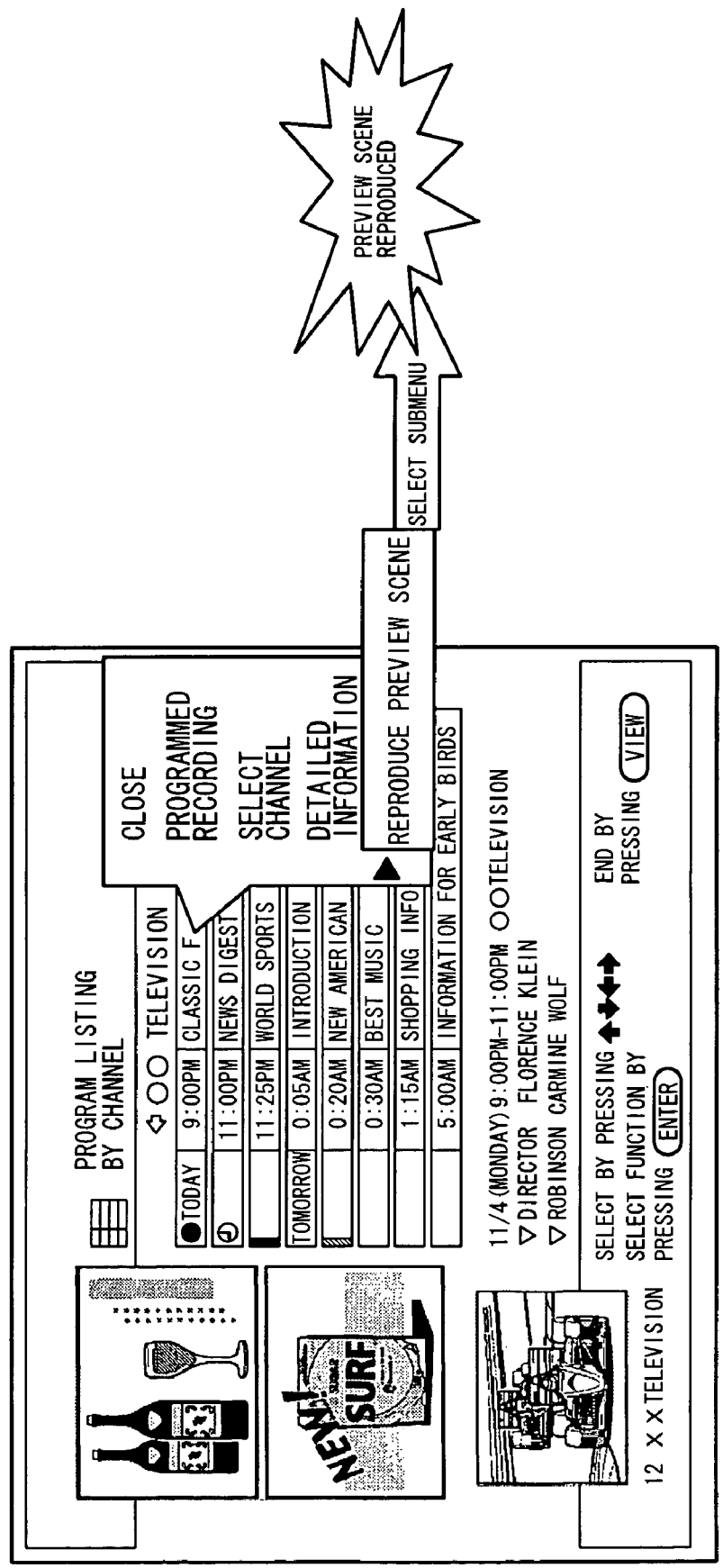
FIG. 13 is a diagram showing a "REPRODUCE PREVIEW SCENE" submenu being additionally displayed on a submenu displayed as a pop-up menu in response to selection of a program desired to be recorded by a user on an EPG screen.

When a preview scene for a program selected to be recorded by the user on an EPG screen is recorded in advance, a "REPRODUCE PREVIEW SCENE" submenu is additionally displayed on a submenu displayed as a pop-up menu. FIG. 13 shows a state at this time. Then, in response to selection of the preview scene reproduction button by the user, the recorded preview scene is reproduced.

After the reproduction is ended, the same preview scene may be reproduced repeatedly. Alternatively, a return to a previous screen of detailed program information may be made. Alternatively, reproduction of another preview scene may be started.

In addition, a "preview scene" category may be provided as one category of a "MyCast" view used for a GUI of a "channel server" that learns user preferences and automatically records recommended programs.

The channel server in this case is a generic term for hard disk recorders, DVD recorders and the like. The channel server has a tuner, and is capable of recording a program specified for programmed recording onto a recording medium such as a hard disk, a DVD or the like and reproducing a recorded program specified for reproduction by the user in arbitrary timing. The channel server is synonymous with a "PVR (Personal Video Recorder)". Some types of channel server have a "remote recording function" of receiving information specifying recording programming from a PC, a portable information terminal, or a portable telephone at a remote place via the Internet and then controlling recording.

The channel server can record a very large number of programs (for example a maximum of 300 titles) on a hard disk, and automatically groups all of recorded titles and programs being broadcast into different categories. A MyCast view is a screen for displaying thumbnails of categories and titles classified by category in lists by two-dimensional arrangement of the plurality of categories in a horizontal direction and titles belonging to one category in a vertical direction. The MyCast view makes it possible to readily find desired titles or programs in different categories. In addition, it is possible to reproduce titles within a category in order continuously.

FIG. 14 schematically shows an example of screen configuration of the MyCast view. When the user presses a left or right switching button on the remote control, for example, on this screen, categories are changed, and when the user further continues to press the button, categories appear one after another repeatedly. When the user presses an up or down switching button, titles or broadcasting stations are changed in one category, and when the user further continues to press the button, titles or broadcasting stations appear one after another repeatedly. Then, reproduction of a program on which a focus is placed on the screen can be started.

FIG. 15 shows a state in which a "preview scene" category is provided on a GUI screen of a channel server. As shown in the figure, preview scenes included in a preview scene list may be reproduced sequentially according to specifications of the MyCast view.

The present invention has been explained above in detail with reference to a specific embodiment. However, it is obvious that those skilled in the art can make modifications of the embodiment and substitutions without departing from the spirit of the present invention. That is, the present invention has been disclosed in a form that is illustrative, and contents described in the present specification are not to be construed as restrictive. In order to determine the spirit of the present invention, a section of claims described at the beginning hereof is to be considered.

What is claimed is:

1. A content viewing support apparatus for facilitating a selection of a predetermined program to be recorded, said content viewing support apparatus comprising:

a preview scene recorded data generating section configured to obtain a preview scene of a program, and generate next preview scene recorded data by identifying from within a received content of a first installment of the program, a preview scene for a next installment of the program, the next installment of the program having the same title as the first installment but having a different content than the first installment; and a preview scene presenting section configured to present, in response to an operation for recording of said program, a recorded preview scene of said program, wherein the received content includes video data for an entire time range of the first installment of the program and the preview scene corresponds to a portion of video data smaller than the entire time range.

2. The content viewing support apparatus as claimed in claim 1, wherein said preview scene recorded data generating section includes:

a preview scene identifying section configured to identify the preview scene of the program;

a preview scene recording managing section configured to program a recording of the identified preview scene; and a preview scene recording section configured to record preview scenes that are programmed to be recorded.

3. The content viewing support apparatus as claimed in claim 2,
wherein said preview scene identifying section identifies the preview scene for the next installment of the program on a basis of segment information that accompanies the received content of the first installment and identifies highlight scenes of the received content and its contents, and identifies a scene for creating a bookmark of a topic headline.

4. The content viewing support apparatus as claimed in claim 2,
wherein when a preview scene for the next installment of the program in the received content of the first installment cannot be identified, said preview scene identifying section estimates one of a time period before an end of the received content of the first installment and a predetermined range in said received content of the first installment to be the preview scene for the next installment of the program.

5. The content viewing support apparatus as claimed in claim 2,
wherein said preview scene recording managing section excludes a preview scene of contents of a main part of a program already entered in a programmed recording list from a preview scene programmed recording list.

6. The content viewing support apparatus as claimed in claim 2,
wherein when the user views an electronic program guide (EPG) listing of the next installment of the program, said preview scene presenting section reproduces a preview scene of the next installment of the program from the next preview scene recorded data.

7. A content viewing support method, implemented on content viewing support apparatus, for facilitating a selection of a predetermined program to be recorded, said content viewing support method comprising:
obtaining a preview scene of a program, and generating next preview scene recorded data by identifying from within a received content of a first installment of the program a preview scene for a next installment of the program, the next installment of the program having the same title as the first installment but having a different content than the first installment; and
presenting, when the user performs an operation for recording of said program, a recorded preview scene of said program,
wherein the received content includes video data for an entire time range of the first installment of the program and the preview scene corresponds to a portion of video data smaller than the entire time range.

8. The content viewing support method as claimed in claim 7,
wherein said generating includes:
identifying the preview scene of the program;
programming recording of the identified preview scene; and
recording preview scenes that are programmed to be recorded.

9. The content viewing support method as claimed in claim 8,
wherein in said identifying the preview scene is identified on a basis of segment information that accompanies the received content of the first installment and identifies highlight scenes of the received content and its contents, and identifies a scene for creating a bookmark of a topic headline.

10. The content viewing support method as claimed in claim 8,
wherein in said identifying, when a preview scene of the next installment of the program in the received content of the first installment of the program cannot be identified, one of a time period before an end of the received content of the first installment and a predetermined range in said received content of the first installment is estimated to be the preview scene for the next installment of the program.

11. The content viewing support method as claimed in claim 8,
wherein in said recording, a preview scene of contents of a main part of a program already entered in a programmed recording list is excluded from a preview scene programmed recording list.

12. The content viewing support method as claimed in claim 8,
wherein in said presenting, when the user views an electronic program guide (EPG) listing of the next installment of the program, a preview scene of the next installment of the program is reproduced from the next preview scene recorded data.

13. A computer readable storage medium encoded with computer executable instructions, which when executed by a computer, cause the computer to perform a method for performing a process for facilitating a selection of a predetermined program to be recorded, said method comprising:
obtaining a preview scene of a program, and generating next preview scene recorded data by identifying from within a received content of a first installment of the program a preview scene for a next installment of the program, the next installment of the program having the same title as the first installment but having a different content than the first installment; and
presenting, when the user performs an operation for recording of said program, a recorded preview scene of said program,
wherein the received content includes video data for an entire time range of the first installment of the program and the preview scene corresponds to a portion of video data smaller than the entire time range.

14. The content viewing support apparatus as claimed in claim 1, wherein when a preview scene for the next installment of the program in the received content of the first installment cannot be identified, said preview scene identifying section estimates a time period near an end of the received content of the first installment to be the preview scene for the next installment of the program.

15. The content viewing support apparatus as claimed in claim 1, wherein the preview scene presenting section presents a plurality of preview scenes as a category on display in a first direction for a user to select, and presents other categories related to programming in a second direction for a user to select to switch categories.

* * * * *